(12) United States Patent
Sun et al.

(10) Patent No.: US 8,940,543 B2
(45) Date of Patent: Jan. 27, 2015

(54) DIAGNOSTIC TOOL AND PROCESS FOR ASSESSING THERMAL UREA GASIFICATION PERFORMANCE

(75) Inventors: William H. Sun, Lisle, IL (US); John M. Boyle, Oak Park, IL (US)

(73) Assignee: Fuel Tech, Inc., Warrenville, IL (US)

( * ) Notice: Subject to any disclaimer, the term of this patent is extended or adjusted under 35 U.S.C. 154(b) by 211 days.

(21) Appl. No.: 13/463,634

(22) Filed: May 3, 2012

(65) Prior Publication Data

US 2012/0288952 A1 Nov. 15, 2012

Related U.S. Application Data

(60) Provisional application No. 61/484,729, filed on May 11, 2011.

(51) Int. Cl.

| | |
|---|---|
| *C01C 3/14* | (2006.01) |
| *F23J 15/00* | (2006.01) |
| *F23N 5/00* | (2006.01) |
| C01C 1/02 | (2006.01) |
| C01C 1/08 | (2006.01) |

(52) U.S. Cl.
CPC ............. *C01C 1/086* (2013.01); *C01C 3/145* (2013.01); *F23J 15/003* (2013.01); *F23J 15/006* (2013.01); *F23N 5/003* (2013.01); *F23J 2215/50* (2013.01); *F23J 2219/10* (2013.01)
USPC ............. 436/113; 433/106; 433/111; 422/83; 422/148

(58) Field of Classification Search
CPC ............. G01N 33/0013; G01N 31/22; G01N 21/3504; G01N 30/02; G01N 21/78; G01N 33/0057; B82Y 15/00; B82Y 30/00; C01C 1/0405; C01C 1/0411; C01C 1/0482; C01C 1/02; C01C 1/08; C01C 1/086; C01C 3/14; C01C 3/145; C01B 3/025; C01B 2203/068; C08F 220/32; F23J 15/00; F23J 15/003; F23J 15/006; F23N 5/00; F23N 5/003
USPC ...................... 422/83, 148; 436/106, 111, 113
See application file for complete search history.

(56) References Cited

U.S. PATENT DOCUMENTS

| | | | | |
|---|---|---|---|---|
| 6,470,760 | B2 * | 10/2002 | Shinozaki et al. | 73/863.33 |
| 7,877,983 | B2 * | 2/2011 | Kunkel et al. | 60/286 |
| 2006/0257303 | A1 * | 11/2006 | Telford | 423/239.1 |
| 2007/0137184 | A1 * | 6/2007 | Patchett et al. | 60/286 |

* cited by examiner

*Primary Examiner* — Natasha Young
(74) *Attorney, Agent, or Firm* — Thaddius J. Carvis

(57) ABSTRACT

Disclosed are methods and apparatus for treating and analyzing a gas stream to determine the effectiveness of urea gasification. The apparatus will be capable of performing the method and will include: means for introducing an aqueous solution of urea into a reactor having hot gases therein and subjecting the aqueous to temperatures for a time to assure the gasification of the aqueous urea and form a thermal gasification product stream containing $NH_3$ and HNCO; means for taking a sample stream from the gasification product stream; means for contacting the sample stream with a hydrolysis catalyst in the presence of sufficient water to convert HNCO to $NH_3$ and form an ammonia sample stream; and means for analyzing the ammonia sample stream for $NH_3$. The methods and apparatus can also be used to control a urea gasification process and/or to signal anomalous operation.

12 Claims, 2 Drawing Sheets

DIAGNOSTIC TOOL AND PROCESS FOR ASSESSING THERMAL UREA GASIFICATION PERFORMANCE

The application claims priority to U.S. Provisional Application 61/484,729, filed on May 11, 2011, which is herein incorporated in its entirety by reference.

FIELD OF THE INVENTION

The invention relates generally treating and analyzing a gas stream to determine the effectiveness of urea gasification.

BACKGROUND OF THE INVENTION

To assess the performance of a number of processes in which urea is gasified by a thermal process, it is necessary to have the ability to determine how much of a feed of urea stream is being properly gasified at any time. The economic and efficient control of on-demand supply of ammonia and/or isocyanic acid requires accurate conversion data. However, there is no known analytical device that will enable the real-time analysis urea conversion products in a gas stream following a thermal conversion reactor.

There are a number of references that discuss converting urea to ammonia. Principal among these, from the inventors standpoint are high-temperature processes such as U.S. Pat. No. 7,090,810 to Sun, et al, which describes a thermal process that can produce complex product gas streams that makes control more complex than would be desired.

When aqueous urea is heated, a number of chemical reactions, controlled by temperature-dependent rate constants, determine how urea is broken down:

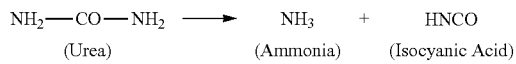

This reaction can occur at a temperature of 275° F.; however, it is not possible to determine the amounts of either the ammonia or the isocyanic acid because the HNCO can be hydrolyzed to urea or form solid byproducts. The HNCO can be converted as follows:

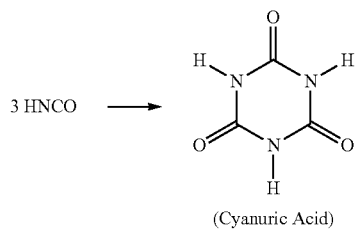

Cyanuric acid, if formed, decomposes at about 700° F. The full conversion of urea to ammonia can involve the following reactions:

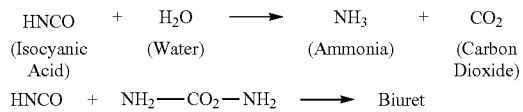

HNCO + Biuret ⟶ Triuret

Triuret ⟶ Cyanuric Acid + NH$_3$

3 HNCO ⟶ Cyanuric Acid

2 NH$_2$—CO$_2$—NH$_2$ + H$_2$CO ⟶ Methylene Diurea

These reactions are rate dependent as well as dependent on the physical form of the reactants, the prevailing temperature, the time in the reactor and the presence or absence of water and/or a catalyst. Thus, the gas stream following a thermal conversion reactor is very complex. Not all of these are desirable and real-time quantitative measurement techniques are not available.

There is a present need for a process, apparatus and system that will enable the real-time analysis urea conversion products in a gas stream following a thermal conversion reactor.

SUMMARY OF THE INVENTION

The present invention provides processes, apparatus and systems for measurement of product constituents necessary to supply data for efficient control of the conversion of urea by thermal processing.

In one aspect, a process is provided comprising: introducing an aqueous solution of urea into a reactor having hot gases therein and subjecting the aqueous urea to temperatures for a time of less than 10 seconds to assure the gasification of the aqueous urea and form a thermal gasification product stream containing NH$_3$ and HNCO; taking a sample stream from the gasification product stream; contacting the sample stream with a hydrolysis catalyst in the presence of sufficient water to convert HNCO to NH$_3$ and form an ammonia sample stream; and analyzing the ammonia sample stream for NH$_3$.

In a preferred aspect, the urea is employed as an aqueous solution having a concentration of within the range of from 30 to 70% by weight to provide an overall molar ratio of water to urea in the system including moisture in the heated air fed to the thermal gasification reactor within the range of from 2:1 to 20:1, preferably within the range of from 3:1 to 10:1.

In another aspect, an apparatus is provided comprising: means for introducing an aqueous solution of urea into a reactor having hot gases therein and subjecting the aqueous urea to temperatures for a time to assure the gasification of the aqueous urea and form a thermal gasification product stream containing NH$_3$ and HNCO; means for taking a sample stream from the gasification product stream; means for contacting the sample stream with a hydrolysis catalyst in the presence of sufficient water to convert HNCO to NH$_3$ and form an ammonia sample stream; and means for analyzing the ammonia sample stream for NH$_3$.

In a further aspect, the invention provides a process for optimizing urea gasification, comprising: introducing an aqueous solution of urea into a reactor having hot gases therein and subjecting the aqueous urea to temperatures for a time to assure the gasification of the aqueous urea and form a thermal gasification product stream containing NH$_3$ and HNCO; taking a sample stream from the gasification product stream; contacting the sample stream with a hydrolysis catalyst in the presence of sufficient water to convert HNCO to NH$_3$ and form an ammonia sample stream; analyzing the ammonia sample stream for NH$_3$ concentration; generating an observation signal representative of the NH$_3$ concentration; comparing the observation signal to a reference value;

generating a control signal representative of the results of the comparison; and operating said reactor in response to said control signal.

In yet another aspect, the invention is useful in monitoring the operation of a urea gasification reactor, by a process comprising: introducing an aqueous solution of urea into the reactor having hot gases therein and subjecting the aqueous urea to temperatures for a time to assure the gasification of the aqueous urea and form a thermal gasification product stream containing $NH_3$ and HNCO; taking a sample stream from the gasification product stream; contacting the sample stream with a hydrolysis catalyst in the presence of sufficient water to convert HNCO to $NH_3$ and form an ammonia sample stream; analyzing the ammonia sample stream for $NH_3$ concentration; generating an observation signal representative of the $NH_3$ concentration; comparing the observation signal to a reference value; generating an alarm signal when results of the comparison are outside preset limits; and generating an alarm in response to said alarm signal.

Preferably, the method and apparatus are employed in combination with a computer and recorder to enable controlled operation of a thermal urea converter.

Systems employing the process and apparatus as disclosed are also provided.

Other and preferred aspects of the invention are described below.

DESCRIPTION OF THE DRAWINGS

The accompanying drawings, which are incorporated in and constitute a part of this description, illustrate presently preferred embodiments of the invention, and together with the detailed description of the preferred embodiments given below, serve to explain the principles of the invention. As shown throughout the drawings, like reference numerals designate like or corresponding parts.

DETAILED DESCRIPTION OF THE INVENTION

Figure 1:
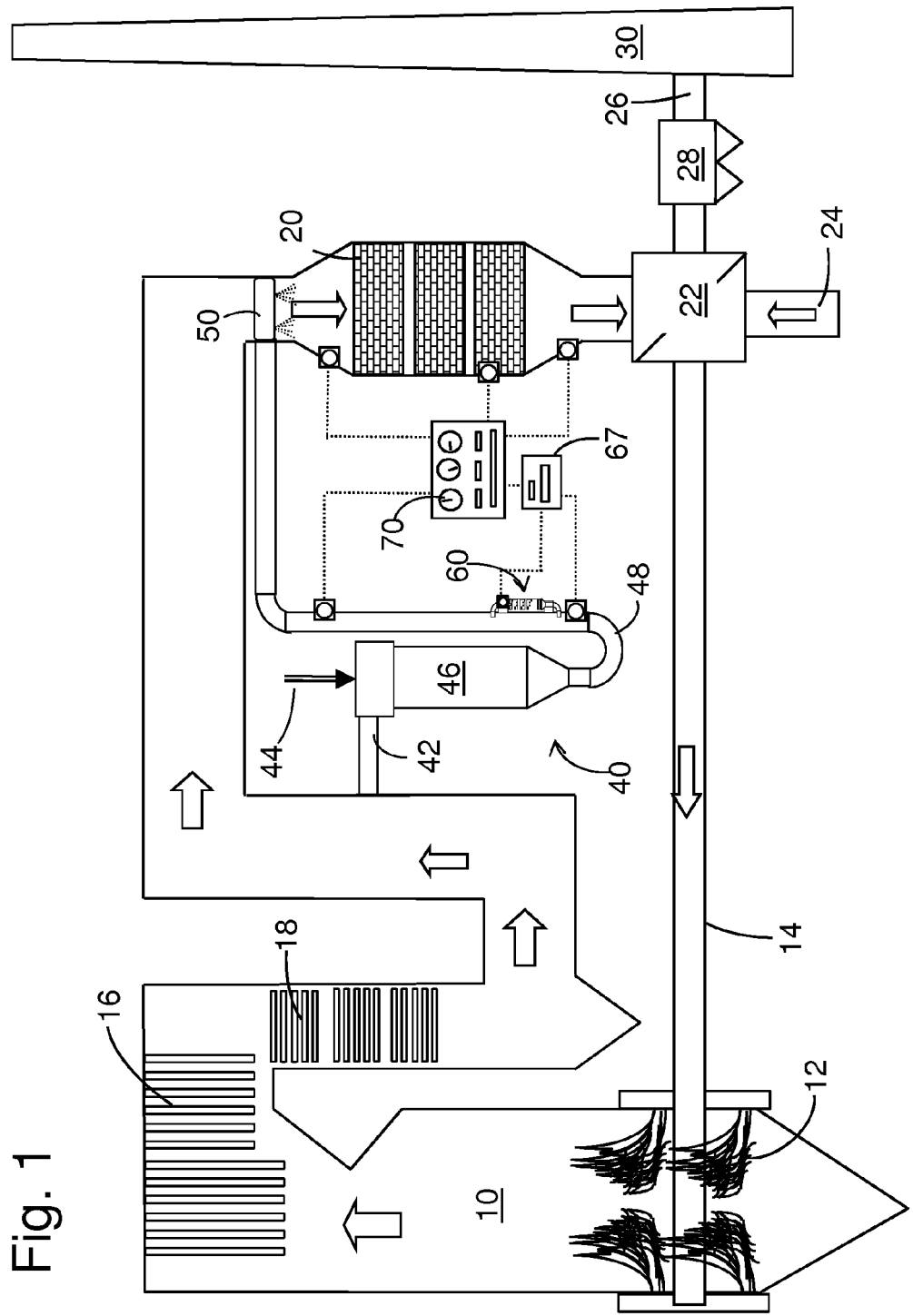
FIG. 1 is a schematic diagram of a combustion installation that takes advantage of the present invention employing a preferred embodiment of the process and system of the invention.
Figure 2:
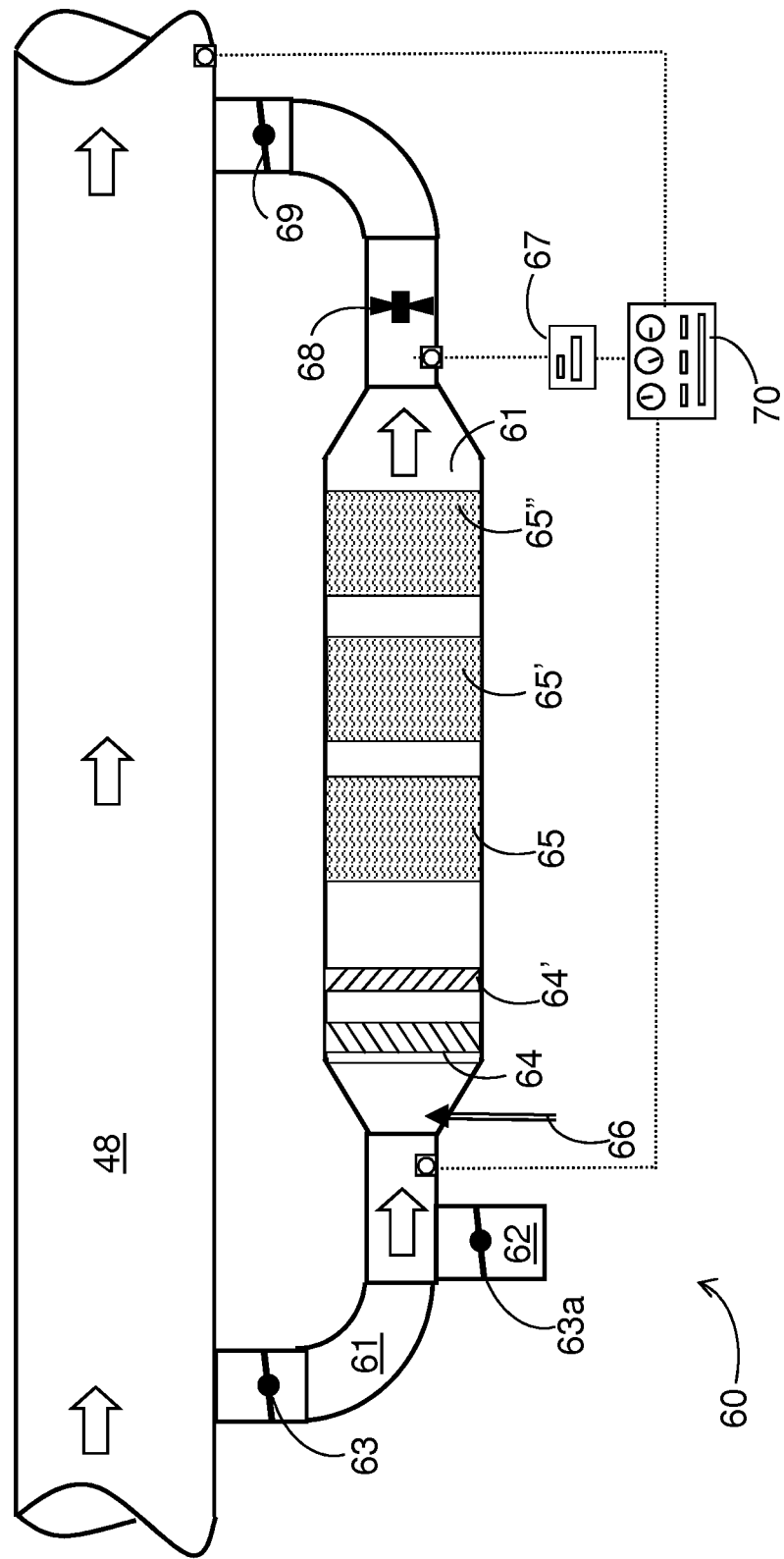
FIG. 2 is a schematic diagram showing greater detail of aspects of a system of the invention of the type shown in FIG. 1.

In describing the present invention, reference is made to the drawings, wherein there is seen a simplified, preferred embodiment shown schematically in FIG. 1 and FIG. 2. The drawings and the process they represent will be described briefly below.

The term "urea" is meant to encompass urea in all of its commercial forms that will typically consist essentially of urea, containing 95% or more urea by weight. This relatively pure form of urea is preferred and has several advantages in the process of the invention. The urea is preferably supplied to the process as an aqueous solution at a concentration of from about 30 to about 70%, with about 45 to about 60% being most preferred.

As noted above, when urea is gasified by a thermal treatment, the reactant gas will not only contain ammonia and isocyanic acid (HNCO), it may contain byproducts from side reactions that will depend on the temperature history of the thermal decomposition products. A gasified product at this stage is not susceptible to continuous, accurate analysis by available equipment. The invention addresses this concern and provides a simple, reliable, low-cost solution.

The invention provides data to quantify urea conversion by continuously taking a sample stream from a thermal gasification product stream containing $NH_3$ and HNCO from thermal processes, such as in the noted process of Sun, et al., which includes a carrier medium, e.g., air or post-combustion gases, water from the air, aqueous urea or post-combustion gases, and possibly some urea decomposition products. Then, the sample stream is passed over a hydrolysis catalyst to convert at least HNCO to $NH_3$ to form an ammonia sample stream wherein ammonia is the principal nitrogenous specie. When the HNCO is converted to $NH_3$ in this manner, the fate of the urea can be known with sufficient reliability for control purposes.

FIG. 1 is a schematic diagram of a combustion installation that takes advantage of the present invention to provide a gasified urea stream obtained by thermally gasifying aqueous urea. The combustion installation includes a combustor 10 having burners that provide thermal heat in combustion zone 12 by burning fuel from a source not shown with air supplied by duct work 14. Hot combustion gases will pass through the furnace 10 in the direction indicated by the block arrows and the heat from combustion is transferred to heat exchangers 16 and 18 prior to passing into a selective catalytic reduction (SCR) reactor 20 wherein $NO_x$ created during combustion can be treated with ammonia or gasified urea (including ammonia and HNCO) to convert the $NO_x$ to nitrogen and water. Alternatively, many installations will benefit from selective non catalytic reduction (SNCR) using urea alone at higher temperatures, e.g., as taught by Epperly, et al., in U.S. Pat. No. 5,057,293, without requiring the reactor 20.

Following SCR reactor 20, the combustion gases will flow through an air-to-air heat exchanger 22, which is used to preheat outside air supplied via duct 24 for delivery to the combustion zone 12 via line 14. The combustion gases leaving the heat exchanger 22 are cooled significantly by the time they are passed through duct work 26 to electrostatic precipitator (ESP) 28 wherein particulates are collected prior to passing the gases up stack 30. This is a highly-simplified version of actual industrial or utility combustors and effluent treatment processes, but illustrates a workable scheme.

A urea gasification system 40 is shown generally in FIG. 1 to include process gas supply 42, an aqueous urea supply 44, a thermal gasification reactor 46 having hot gases therein wherein the aqueous urea is subjected to gasification temperatures for a time of less than 10 seconds to assure the gasification of the aqueous urea and form a thermal gasification product stream withdrawn via duct 48 and containing $NH_3$ and HNCO prior to passing into the SCR reactor 20 via ammonia injection grid 50.

The invention enables simplified and real-time analysis of the stream for active $NO_x$ reducing species in an apparatus shown generally as 60. In this apparatus a sample stream is taken off of line 48 via line 61, best seen in FIG. 2. Line 61 is also shown supplied with a purge line 62 each controlled by respective valves 63 and 63a. The apparatus 60 includes mixing devices 64 and 64' and hydrolysis catalysts 65, 65' and 65". The catalysts are selected for their ability to essentially completely convert HNCO in the gases passed through them to ammonia and thereby form an ammonia sample stream conveyed by downstream portion of line 61, wherein ammonia is the principal nitrogenous specie. The ammonia sample stream is then analyzed by contacting it with a suitable ammonia analyzer 67, e.g., a tunable diode laser (TDL) ammonia analyzer as is known for the purpose, e.g., as available from Yogokawa, Siemens, Sick, Unisearch, etc. A fan 68 can be employed to maintain proper gas flow through the catalysts and analyzer 67. A suitable valve 69 can be employed to enable closing duct 61 at the end of apparatus 60 downstream of analyzer 67.

The urea gasification system 40 can be employed to supply ammonia alone or with HNCO to a relatively low volume use at low temperatures and low concentrations, e.g., to an ESP at concentrations of only 1 to 30 ppm, e.g., 3 to 10 ppm. The system can also be configured to supply a stream at higher ammonia and HNCO concentrations, such as for SCR, at higher concentrations, e.g., 100 to 1000 ppm.

The heated gases entering urea gasification system 40 via inlet 42 will gasify the urea, principally to ammonia and isocyanic acid (HNCO), leaving essentially no liquids or solids. The gases entering urea gasification system 40 will preferably be within the range of from 700 to 1200° F. at inlet and will be sufficient to fully gasify the aqueous urea solution for their time in the gasification reactor, to provide a gas stream comprising ammonia and isocyanic acid. This gas stream can be withdrawn from the urea gasification system 40 and maintained at a temperature of above 500° F. for use as is or fed to a point of introduction into a second stage catalytic reactor where the first stage gas stream will be passed into a second stage catalytic hydrolysis reactor at a temperature of from 350 to 600° F. for conversion of the HNCO to ammonia.

The gases are preferably heated to greater than 800° F. prior to being introduced into the urea gasification system 40 at a temperature where they should remain above at least 600° F. Entering gas temperatures of from 850° to 1200° F. can be employed effectively. Supplemental heat can be supplied to the chamber as necessary. And, preferably, the urea gasification system 40 will be well insulated to aid in temperature maintenance. The temperature of the gases and the residence time prior to exit from the urea gasification system 40 will be effective to achieve full gasification. The entry temperature and temperature maintenance in urea gasification system 40 should be high enough also to maintain an exit temperature of at least about 450° F. and preferably at least 500° F.

FIG. 2 shows the ammonia/HNCO supply system 40 in greater detail, yet still schematically. The numbering for FIG. 2 employs the numbers from FIG. 1, where applicable and continues with additional features, such as controller 70 and associated sensors (◻) and valves (—▶—), which are illustrated by the symbols shown here parenthetically. Incoming process air line 42 can include a damper (not shown), which like the other dampers and valves can be controllable by controller 70 and associated exemplary control lines (which may be hard wired or wireless) shown in dotted lines. FIG. 2 also shows optional steam feed line 66, without showing the source.

The urea is preferably supplied to the first stage of the process as an aqueous solution at a concentration of from about 30 to about 70%, with about 45 to about 60% being most preferred. The relative molar amounts of urea, water and air are important for successful operation.

The catalysts 65, 65' and 65" are preferably of the type used in SCR systems, typical of which are those with vanadium contents of from about 1 to about 4%. Other catalysts can be employed. The catalyst is desirably of a size to provide space velocities of 1000 to 10,000 $hr^{-1}$, e.g., from about 2500 to about 7500 $hr^{-1}$. The catalyst structure will preferably be monolithic with continuous channels causing little pressure drop across the depth or length of the catalyst and have a pitch of from 1 to 10 mm to accommodate this purpose. Catalysts based on vanadium, titanium and tungsten, typically as oxides, will be effective. In one embodiment a $TiO_2$ catalyst with a pitch of about 4 mm and containing a vanadium content of between 1 and 2% is effective. The catalyst can be a waste or used SCR catalyst.

The process steps will both require careful temperature control, and the second stage will require at least a critical amount of water without employing so much that the equipment must be too large to operate efficiently and create thermal demands in excess of those necessary for effective reaction.

It has also been found important to run the reaction in a manner to maintain a low concentration of intermediate products, e.g., isocyanic acid, in particular, so as to minimize the chances for side reactions to produce adverse byproducts, e.g., in cold spots in the reactors or ducting.

The molar ratios of air to water to urea in the sample stream as fed to the catalysts 65, 65' and 65" will most effectively be from about 500:20:1 to about 1000:5:1. The molar ratios of water to urea will most effectively be from about 2:1 to 20:1, preferably within the range of from 3:1 to 10:1. For the analyzer to have present essentially all ammonia to achieve an accurate reading, a sufficient amount of water must be present. The amount of water present for hydrolysis will include that added by both the urea solution, including any dilution water, and the system air, and must be sufficient to fully hydrolyze the HNCO in the second stage of the process. As noted, additional water can be added as steam via line 66, if required.

Importantly, the droplets of aqueous urea are supplied to the urea gasification system 40 with a size small enough to release the urea for decomposition early in a short, e.g., 1 to 10 second, time frame to fully gasify the urea and minimize any likelihood of forming byproducts downstream in the ductwork or the catalyst. Temperature, reactants, droplet size, and heating time must all work together to achieve the correct reaction kinetics for full urea gasification without solid byproduct production. In the urea gasification system 40, it is important to employ suitably high temperatures, obtain a small droplet size of urea in the chamber and avoid the presence of cold spots. Droplet sizes are preferably controlled to be less than 500 µm, typically from 20 to 200 µm, as measured by laser techniques. Residence time in the chamber is necessarily short, e.g., on the order of from 1 to 10 seconds, typically from 2 to 6 seconds.

The invention is useful for controlling, e.g., optimizing, urea gasification. In this embodiment, the ammonia analyzer 67 will generate an observation signal representative of the $NH_3$ concentration; the controller 70 or associated computer will compare the observation signal to a reference value and generate a control signal representative of the results of the comparison. Then, based on this control signal, the reactor 46 will be controlled in response, e.g., temperature or reagent flow adjustment, to said control signal.

The invention is also useful in monitoring the operation of a urea gasification reactor 46 and warning of anomalous operation. In this embodiment, the operator can be warned of anomalies such as low urea feed concentration, low pump feed rate, feed or output flow disturbances, and the like. The ammonia sample stream will be analyzed for $NH_3$ concentration by ammonia analyzer 67, which will generate an observation signal representative of the $NH_3$ concentration. This observation signal will then be compared to a reference value by the controller 70 or associated computer, and an alarm signal will be generated when results of the comparison are outside preset limits. An alarm can then be sounded or otherwise indicated.

Systems employing the process and apparatus combine the disclosed features and incorporate details as necessary for a wide variety of industrial applications.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. A process comprising: introducing an aqueous solution of urea into a reactor having hot gases therein and subjecting the aqueous urea to temperatures for a time to assure the gasification of the aqueous urea and form a thermal gasification product stream containing $NH_3$ and HNCO; taking a sample stream from the gasification product stream; contacting the sample stream with a hydrolysis catalyst in the presence of sufficient water to convert HNCO to $NH_3$ and form an ammonia sample stream; and analyzing the ammonia sample stream for $NH_3$.

2. A process according to claim 1 wherein the sample stream is directed to a duct and passed to a process requiring a source of ammonia.

3. A process according to claim 2 wherein the sample stream is directed to the gasification product stream.

4. An apparatus comprising: means for introducing an aqueous solution of urea into a reactor having hot gases therein and subjecting the aqueous urea to temperatures for a time to assure the gasification of the aqueous urea and form a thermal gasification product stream containing $NH_3$ and HNCO; means for taking a sample stream from the gasification product stream; means for contacting the sample stream with a hydrolysis catalyst in the presence of sufficient water to convert HNCO to $NH_3$ and form an ammonia sample stream; and means for analyzing the ammonia sample stream for $NH_3$.

5. An apparatus according to claim 4 further including duct means for directing the sample stream to a process requiring a source of ammonia.

6. An apparatus according to claim 5 wherein duct means direct the sample stream to the gasification product stream.

7. A process for controlling urea gasification by a process that includes converting all of a gasified urea to ammonia in a small sample stream as a means for determining the effectiveness of urea gasification by the urea gasification reactor, the process comprising:

a. introducing an aqueous solution of urea into a reactor having hot gases therein and subjecting the aqueous urea to temperatures for a time to assure the gasification of the aqueous urea and form a thermal gasification product stream containing $NH_3$ and HNCO;

b. taking a sample stream from the gasification product stream;

c. contacting the sample stream with a hydrolysis catalyst in the presence of sufficient water to convert all HNCO in said sample stream to $NH_3$ and form an ammonia sample stream;

d. analyzing the ammonia sample stream for $NH_3$ concentration;

e. generating an observation signal representative of the $NH_3$ concentration;

f. comparing the observation signal to a reference value;

g. generating a control signal representative of the results of the comparison; and h. operating said reactor in response to said control signal.

8. A process according to claim 7 wherein the sample stream is directed to a duct and passed to a process requiring a source of ammonia.

9. A process according to claim 8 wherein the sample stream is directed to the gasification product stream.

10. A process for monitoring the operation of a urea gasification reactor by a process that includes converting all of a gasified urea to ammonia in a small sample stream as a means for determining the effectiveness of urea gasification by the urea gasification reactor, the process comprising:

a. introducing an aqueous solution of urea into the reactor having hot gases therein and subjecting the aqueous urea to temperatures for a time to assure the gasification of the aqueous urea and form a thermal gasification product stream containing $NH_3$ and HNCO;

b. taking a sample stream from the gasification product stream;

c. contacting the sample stream with a hydrolysis catalyst in the presence of sufficient water to convert all of the HNCO to $NH_3$ and form an ammonia sample stream;

d. analyzing the ammonia sample stream for $NH_3$ concentration;

e. generating an observation signal representative of the $NH_3$ concentration;

f. comparing the observation signal to a reference value;

g. generating an alarm signal when results of the comparison are outside preset limits; and h. generating an alarm in response to said alarm signal.

11. A process according to claim 10 wherein the sample stream is directed to a duct and passed to a process requiring a source of ammonia.

12. A process according to claim 11 wherein the sample stream is directed to the gasification product stream.

* * * * *